United States Patent
Yuasa et al.

(10) Patent No.: US 6,495,991 B2
(45) Date of Patent: *Dec. 17, 2002

(54) CHARGE CONTROL APPARATUS FOR CONTROLLING A CHARGE OF A BATTERY PACK BASED UPON REFRIGERANT TEMPERATURE, BATTERY TEMPERATURE AND AMBIENT TEMPERATURE

(75) Inventors: Shinichi Yuasa, Kyoto (JP); Mitsugu Takaki, Aichi (JP)

(73) Assignees: Matsushita Electric Industrial Co., Ltd., Kadoma (JP); Toyota Jidosha Kabushiki Kaisha, Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/571,873

(22) Filed: May 12, 2000

(65) Prior Publication Data

US 2002/0101219 A1 Aug. 1, 2002

(30) Foreign Application Priority Data

May 14, 1999 (JP) ............................................. 11-134990

(51) Int. Cl.[7] ................................................. H02J 7/04
(52) U.S. Cl. ...................................................... 320/150
(58) Field of Search ................................. 320/150, 152, 320/153; 374/141, 134

(56) References Cited

U.S. PATENT DOCUMENTS 5,079,716 A * 1/1992 Lenhardt et al. ............ 320/153
5,235,946 A * 8/1993 Fodale et al. ................ 477/109
5,711,605 A   1/1998 Reher et al. ................. 374/141
5,756,227 A * 5/1998 Suzuki et al. ................. 429/62
6,076,964 A * 6/2000 Wu et al. ..................... 374/141
6,130,003 A * 10/2000 Etoh et al. ..................... 429/99

FOREIGN PATENT DOCUMENTS

| | | |
|---|---|---|
| DE | 44 43 015 | 6/1995 |
| JP | 8148187 | 5/1998 |
| JP | 10-106638 | 7/1998 |
| JP | 11-055869 | 5/1999 |

OTHER PUBLICATIONS

European Search Report regarding corresponding European Application No. 00110062.7-2207 dated Dec. 18, 2001.

* cited by examiner

Primary Examiner—Gregory J. Toatley, Jr.
Assistant Examiner—Pia Tibbits
(74) Attorney, Agent, or Firm—Renner, Otto, Boisselle & Sklar

(57) ABSTRACT

A charge control apparatus for a battery pack having a cooling structure includes: a refrigerant temperature sensor for detecting a refrigerant temperature of a refrigerant which cools the battery pack; a battery temperature sensor for detecting a battery temperature of the battery pack; an ambient temperature sensor for detecting an ambient temperature of the battery pack; and a control section for controlling the charge of the battery pack, based on the refrigerant temperature detected by the refrigerant temperature sensor, the battery temperature detected by the battery temperature sensor and the ambient temperature detected by the ambient temperature sensor.

4 Claims, 2 Drawing Sheets

CHARGE CONTROL APPARATUS FOR CONTROLLING A CHARGE OF A BATTERY PACK BASED UPON REFRIGERANT TEMPERATURE, BATTERY TEMPERATURE AND AMBIENT TEMPERATURE

BACKGROUND OF THE INVENTION

1. Field of the Invention

The present invention relates to a charge control apparatus for a battery pack having a cooling structure, and more specifically relates to a charge control apparatus for a battery pack using the ambient temperature of the battery.

2. Description of the Related Art

Japanese Laid-open Publication No. 8-148187 discloses a technique of controlling the temperature of a battery through a heat-transfer plate by controlling the external temperature.

In the charge control of a battery pack having an air cooling structure, the temporal change dT/dt of the battery temperature is controlled based on a battery temperature $T_B$ and the air temperature $T_A$, which is represented by the following formula:

$$dT/dt = (T_B - T_{B-1}) + K(T_B - T_A),$$

where:
$T_B$ is the battery temperature;
$T_A$ is the air temperature; and
K is the heat radiation coefficient.

In the charge control of a battery pack having a liquid cooling structure, the temporal change dT/dt of the battery temperature is controlled based on the battery temperature $T_B$ and a coolant temperature $T_W$, which is represented by the following formula:

$$dT/dt = (T_B - T_{B-1}) + K(T_B - T_W),$$

where:
$T_B$ is the battery temperature;
$T_W$ is the coolant temperature; and
K is the heat radiation coefficient.

In a battery pack having a cooling structure, however, the battery temperature is affected not only by the coolant temperature but also by the ambient temperature. Therefore, if the temporal change dT/dt of the battery temperature is controlled based only on the battery temperature and the coolant temperature, a precise control of the temporal change dT/dt of the battery temperature Is impossible in the case where the difference between the ambient temperature and the coolant temperature is great.

Also, in the case where the difference between the ambient temperature and the battery temperature is great, the battery temperature is affected by the ambient temperature. As a result, the baseline of the temporal change dT/dt of the battery temperature varies as the ambient temperature varies. Accordingly, the charge capacity of the battery fluctuates greatly in accordance with the ambient temperature.

SUMMARY OF THE INVENTION

The charge control apparatus for a battery pack having a cooling structure of this invention includes: a coolant temperature sensor for detecting temperature of a refrigerant which cools the battery pack; a battery temperature sensor for detecting a battery temperature of the battery pack; an ambient temperature sensor for detecting an ambient temperature of the battery pack; and a control section for controlling the charge of the battery pack, based on the refrigerant temperature detected by the refrigerant temperature sensor, the battery temperature detected by the battery temperature sensor and the ambient temperature detected by the ambient temperature sensor.

In another aspect of the invention, a charge control apparatus for an EV battery having a liquid cooling structure includes: a coolant temperature sensor for detecting a coolant temperature of coolant which refrigerates the EV battery; a battery temperature sensor for detecting a battery temperature of the EV battery; an ambient temperature sensor for detecting an ambient temperature of the EV battery; and a control section for controlling the charge of the EV battery, based on the coolant temperature detected by the coolant temperature sensor, the battery temperature detected by the battery temperature sensor and the ambient temperature detected by the ambient temperature sensor.

In one embodiment of the invention, the control section may control the charge capacity of the battery pack based on a value of a temporal change dT/dt of the battery temperature of the battery pack, when:

$$dT/dt = (T_B - T_{B-1}) + (KW/1+k) \times (T_B - (T_W + kT_A)/(1+k)) + ((k \times kA)/(1+k)) \times (T_B - ((T_W + k \times T_A)/(1+k)),$$

where:
dT/dt is the temporal change of the battery temperature;
$T_W$ is the refrigerant temperature;
$T_A$ is the ambient temperature;
$T_B$ is the battery temperature;
KW is the heat radiation coefficient of the refrigerant;
kA is the heat radiation coefficient of the ambient; and
k is the coefficient defining the final resultant temperature of the battery.

In another embodiment of the present invention, the control section may control the charge capacity of the EV battery based on a value of a temporal change dT/dt of the battery temperature of the EV battery, when:

$$dT/dt = (T_B - T_{B-1}) + (KW/1+k) \times (T_B - (T_W + kT_A)/(1+k)) + ((k \times kA)/(1+k)) \times (T_B - ((T_W + k \times T_A)/(1+k)),$$

where:
dT/dt is the temporal change of the battery temperature;
$T_W$ the coolant temperature;
$T_A$ is the ambient temperature;
$T_B$ is the battery temperature:
KW is the heat radiation coefficient of the coolant;
kA is the heat radiation coefficient of the environment; and
k is the coefficient defining the final resultant temperature of the battery.

In another embodiment of the invention a charge control apparatus for a battery pack may further include a circulator for supplying the refrigerant to the battery pack.

In still another embodiment of the invention a charge control apparatus for an EV battery according to claim 2 may further include a circulator for supplying the coolant to the EV battery Thus, the invention described herein makes possible the advantages of (1) providing a charge control apparatus for a battery pack, which Is capable of precisely controlling the temporal change dT/dt of the battery temperature even when the difference between the ambient temperature and the coolant temperature is great, and (2) providing a charge control apparatus for a battery pack, in which the fluctuation of the charge capacity of the battery caused by the difference of the ambient temperature is small.

These and other advantages of the present invention will become apparent to those skilled in the art upon reading and understanding the following detailed description with reference to the accompanying figures.

DESCRIPTION OP THE PREFERRED EMBODIMENTS

Figure 1:
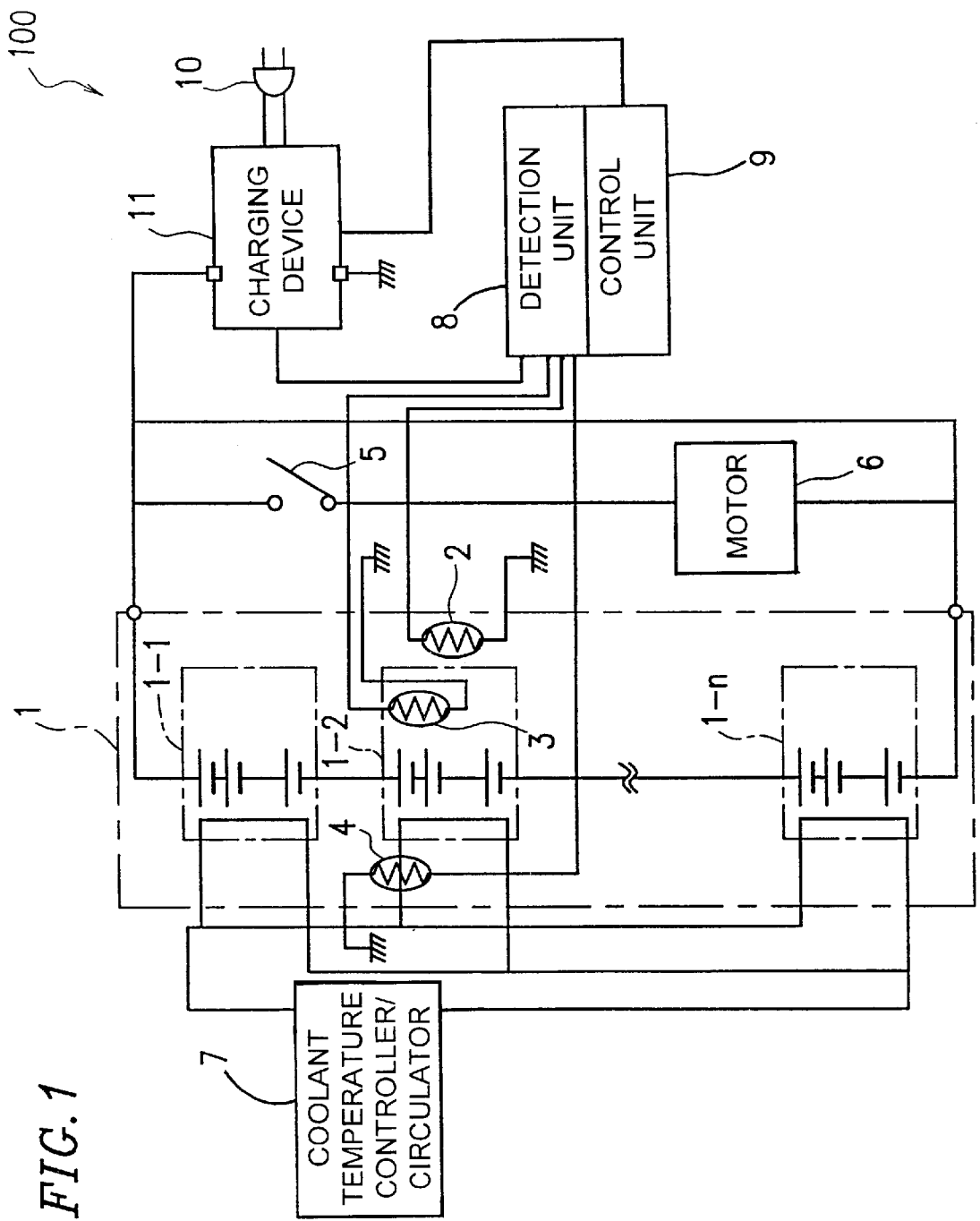
FIG. 1 is a diagram showing a configuration of a charge control apparatus for a battery pack according to an embodiment of the present invention.

FIG. 1 shows a configuration of a charge control apparatus 100 in an embodiment according to the present invention. The charge control apparatus 100 may be used with a battery (EV battery) for electric cars. A battery pack 1 includes batteries 1—1, 1-2 ... 1-n. The batteries 1—1, 1-2 ... 1-n are serially connected.

The charge control apparatus 100 includes a coolant temperature controller/circulator 7 for cooling the battery pack 1, a coolant temperature sensor 4 for detecting a coolant temperature $T_W$ of the coolant for cooling the battery 1-2, a battery temperature sensor 3 for detecting the battery temperature $T_B$ of the battery 1-2, and an ambient temperature sensor 2 for detecting the ambient temperature $T_A$ of the battery pack 1.

The charge control apparatus 100 further includes a control unit 9 for controlling the charge of the battery pack 1 based on the coolant temperature $T_W$ detected by the coolant temperature sensor 4, the battery temperature $T_B$ detected by the battery temperature sensor 3 and the ambient temperature $T_A$ detected by the ambient temperature sensor 2.

The coolant temperature sensor 4, the battery temperature sensor 3 and the ambient temperature sensor 2 are connected to a detection unit 8. The detection unit 8 provides the control unit 9 with the coolant temperature $T_W$ detected by the coolant temperature sensor 4, the battery temperature $T_B$ detected by the battery temperature sensor 3 and the ambient temperature $T_A$ detected by the ambient temperature sensor 2.

The charge control apparatus 100 further Includes a charging device 11, a commercial power supply 10, a motor 6 and an accelerator 5. The control unit 9 controls the charge capacity of the battery pack 1 by the charging device 11.

When the control unit 9 controls the charge capacity of the battery pack 1 by the charging device 11, it uses the temporal change dT/dt of the battery temperature, which is represented by the following formula 1:

$$dT/dt = (T_B - T_{B-1}) + \frac{1}{1+k}K_W\left(T_B - \frac{T_W + kT_A}{1+k}\right) + \frac{k}{1+k}K_A\left(T_B - \frac{T_W + kT_A}{1+k}\right) \quad \text{(Formula 1)}$$

where:
dT/dt is the temporal change of the battery temperature:
$T_W$ is the coolant temperature;
$T_A$ is the ambient temperature;
$T_B$ is the battery temperature;
KW is the heat radiation coefficient of the coolant;
kA is the heat radiation coefficient of the environment: and
k is the coefficient defining the final resultant temperature of the battery.

In Formula 1, $(T_W + k \times T_A)/(1+k)$ corresponds to the final temperature of the battery determined by the coolant temperature and the ambient temperature. The control unit 9 controls the charge capacity of the battery pack 1 based on the value of the temporal change dT/dt of the battery temperature determined by Formula 1 above.

Figure 2:
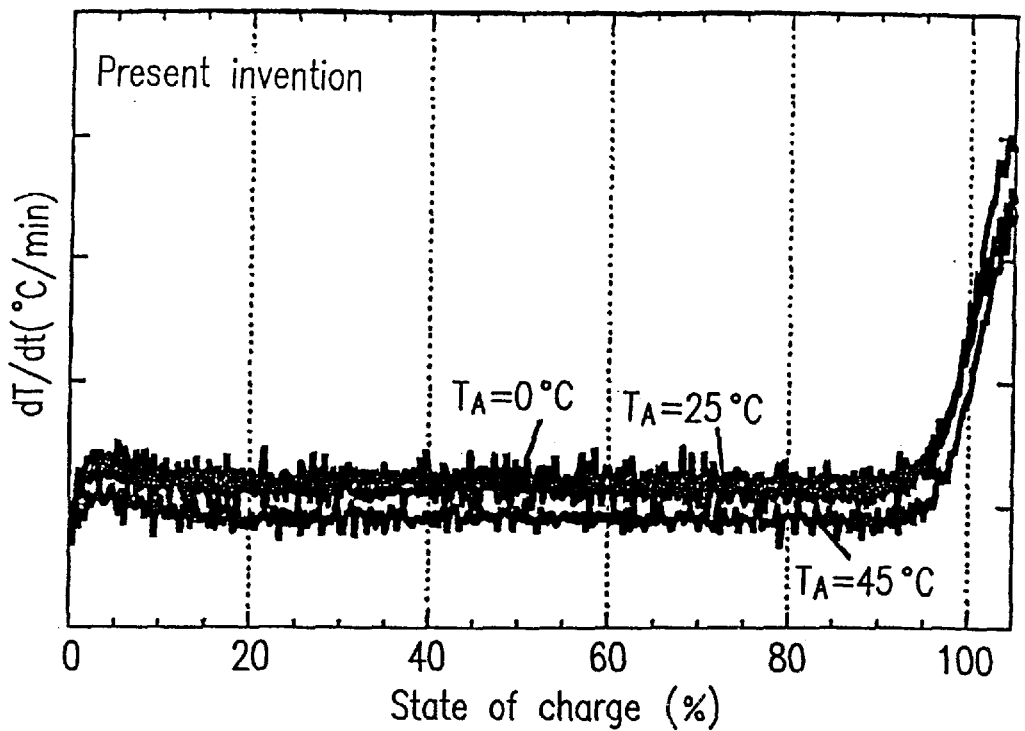
FIG. 2 is a graph showing the relationship between the temporal change dT/dt of the battery temperature and the state of charge at different ambient temperatures according to an embodiment of the present invention.

FIG. 2 is a graph showing the relationship between the temporal change dT/dt of the battery temperature and the state of charge at different ambient temperatures in this embodiment according to the present invention.

The control unit 9 controls the charge capacity of the battery pack 1 by the charging device 11, based on the temporal change dT/dt of the battery temperature determined by Formula 1. The graph in FIG. 2 shows the results of the charge control apparatus at the ambient temperature $T_A=0°$ C., the ambient temperature $T_A=25°$ C. and the ambient temperature $T_A=45°$ C., respectively. It is understood from the graph that in a battery pack having a cooling structure, the value of the temporal change dT/dt of the battery temperature demonstrates a good reproducibility.

Figure 3:
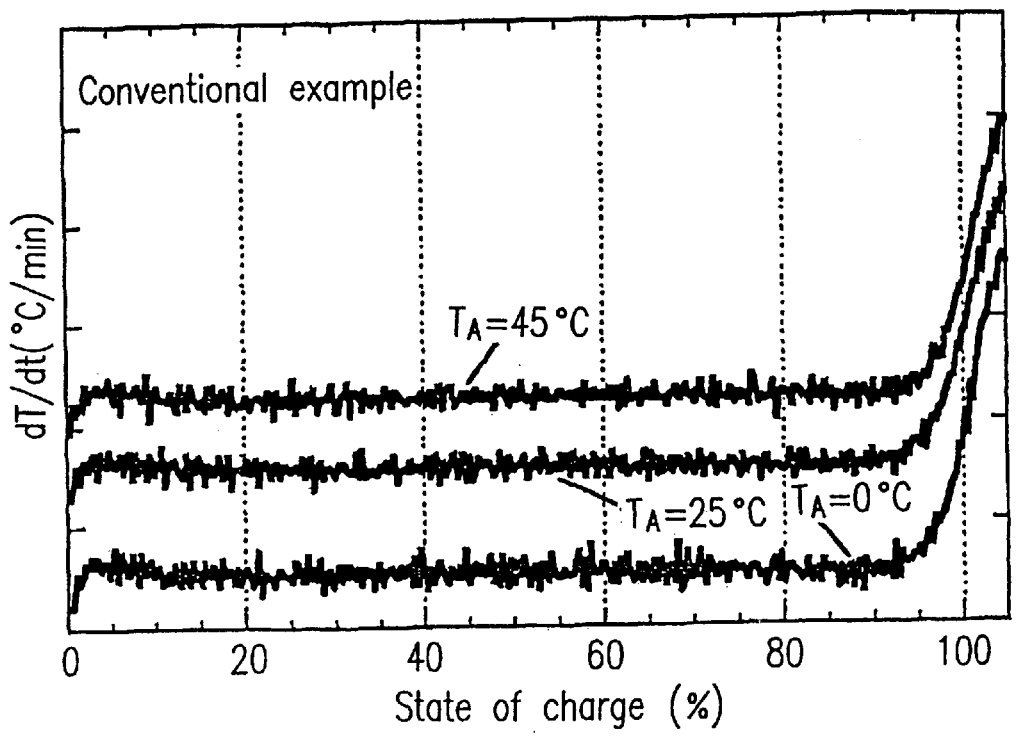
FIG. 3 is a graph showing the relationship between the temporal change dT/dt of the battery temperature and the state of charge at different ambient temperatures in a conventional embodiment.

FIG. 3 is a graph showing the relationship between the temporal change dT/dt of the battery temperature and the state of charge at different ambient temperatures according to a conventional charge control apparatus.

In a conventional charge control apparatus, which does not utilize the ambient temperature, the baselines of the temporal change dT/dt of the battery temperature vary among the ambient temperature $T_A=0°$ C., the ambient temperature $T_A=25°$ C. and the ambient temperature $T_A=45°$ C.

As shown in FIG. 2, according to the charge control apparatus of the present embodiment, in which the ambient temperature $T_A$ is utilized, the baselines of the temporal change dT/dt of the battery temperature do not vary (essentially showing the same value) among the ambient temperature $T_A=0°$ C., the ambient temperature $T_A=25°$ C. and the ambient temperature $T_A=45°$ C. Therefore, the fluctuation of the charge capacity in accordance with the ambient temperature can be alleviated.

The prior art disclosed in the aforementioned Japanese Laid-open Publication No. 8-148187 is an invention which controls the temperature of batteries through a heat-transfer plate by controlling the external temperature. On the contrary according to the present invention, the external temperature (i.e., the ambient temperature $T_A$) is merely a parameter for the control, and therefore the external temperature is not controlled. The present invention controls the internal temperature of the heat-transfer plate with regard to the external temperature.

As described above, according to the charge control apparatus 100 of the present embodiment, the charge of the battery pack 1 is controlled based on the coolant temperature $T_W$ detected by the coolant temperature sensor 4, the battery temperature $T_B$ detected by the battery temperature sensor 3 and the ambient temperature $T_A$ detected by the ambient temperature sensor 2. Therefore, the temporal change dT/dt of the battery temperature is precisely controlled even if the difference between the ambient temperature $T_A$ and the coolant temperature $T_W$ is large.

Further according to the charge control apparatus 100 of the present embodiment, the baselines of the temporal change dT/dt of the battery temperature do not vary even if the ambient temperature $T_A$ varies. Therefore, the fluctuation of the charge capacity of the battery caused by the change of the ambient temperature $T_A$ is reduced.

The battery pack according to the present embodiment, may be an EV battery. Although in the present embodiment coolant is used for a refrigerant, the present invention is not limited to this embodiment. A refrigerant other than water, e.g., chlorofluorocarbon may also be used.

As described above, according to the present invention, a charge control apparatus for a battery pack is provided for precisely controlling the temporal change dT/dt of the battery temperature even if the difference between the ambient temperature and the coolant temperature is large.

According to the present invention, a charge control apparatus for a battery pack is further provided for reducing the fluctuation of the charge capacity of the battery caused by the change of the ambient temperature.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A charge control apparatus for a battery pack having a cooling structure, comprising:

a refrigerant temperature sensor for detecting a refrigerant temperature of a refrigerant which cools the battery pack;

a battery temperature sensor for detecting a battery temperature of the battery pack;

an ambient temperature sensor for detecting an ambient temperature of the battery pack; and a control section for controlling the charge of the battery pack, based on the refrigerant temperature detected by the refrigerant temperature sensor, the battery temperature detected by the battery temperature sensor and the ambient temperature detected by the ambient temperature sensor, wherein the control section controls the charge of the battery pack based on a value of a temporal change dT/dt of the battery temperature of the battery pack, when:

$$dT/dt=(T_B-T_{B-1})+(KW/1+k)\times(T_B-(T_W+kT_A)/(1+k))+((k\times kA)/(1+k))\times(T_B-((T_W+k\times T_A)/(1+k)),$$

where:

dT/dt is the temporal change of the battery temperature;

$T_W$ is the refrigerant temperature;

$T_A$ is the ambient temperature;

$T_B$ is the battery temperature;

KW is the heat radiation coefficient of the refrigerant;

kA is the heat radiation coefficient of the environment; and k is the coefficient defining the final resultant temperature of the battery.

2. A charge control apparatus for a battery pack according to claim 1, further comprising a circulator for supplying the refrigerant to the battery pack.

3. A charge control apparatus for an EV battery having a liquid cooling structure, comprising:

a coolant temperature sensor for detecting a coolant temperature of coolant which cools the EV battery;

a battery temperature sensor for detecting a battery temperature of the EV battery;

an ambient temperature sensor for detecting an ambient temperature of the EV battery; and a control section for controlling the charge of the EV battery, based on the coolant temperature detected by the coolant temperature sensor, the battery temperature detected by the battery temperature sensor and the ambient temperature detected by the ambient temperature sensor, wherein the control section controls the charge of the EV battery based on a value of a temporal change dT/dt of the battery temperature of the EV battery, when:

$$dT/dt=(T_B-T_{B-1})+(KW/1+k)\times(T_B-(T_W+kT_A)/(1+k))+((k\times kA)/(1+k))\times(T_b-((T_W+k\times T_A)/(1+k)),$$

where:

dT/dt is the temporal change of the battery temperature;

$T_W$ is the coolant temperature;

$T_A$ is the ambient temperature;

$T_B$ is the battery temperature;

KW is the heat radiation coefficient of the coolant;

kA is the heat radiation coefficient of the environment; and k is the coefficient defining the final resultant temperature of the battery.

4. A charge control apparatus for an EV battery according to claim 3, further comprising a circulator for supplying the coolant to the EV battery.

* * * * *